Jan. 1, 1935.  W. H. SCHOMBURG ET AL  1,986,227
LEVER
Filed May 24, 1930   2 Sheets-Sheet 1
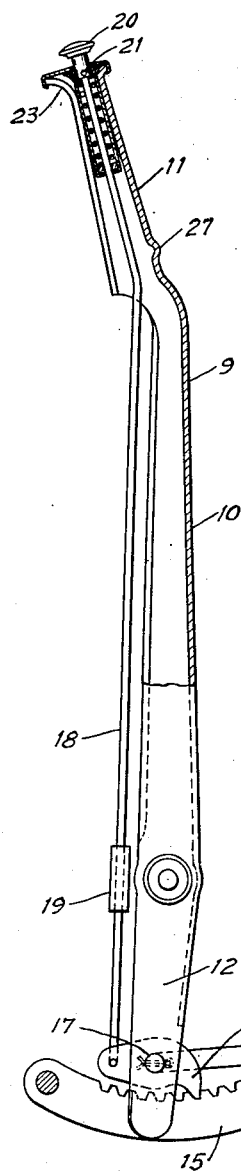
Fig. 1.
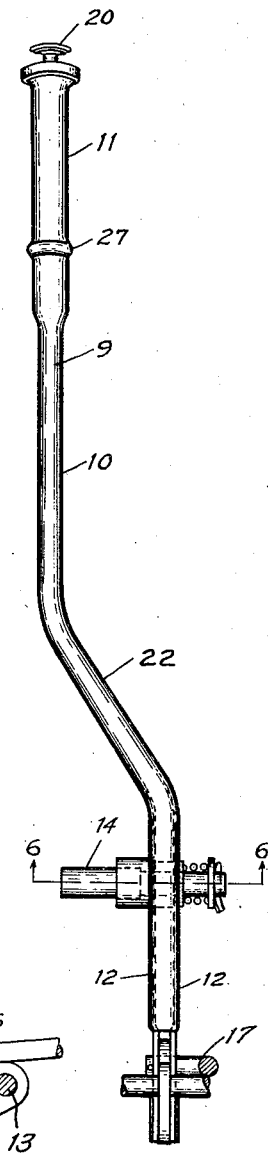
Fig. 2.
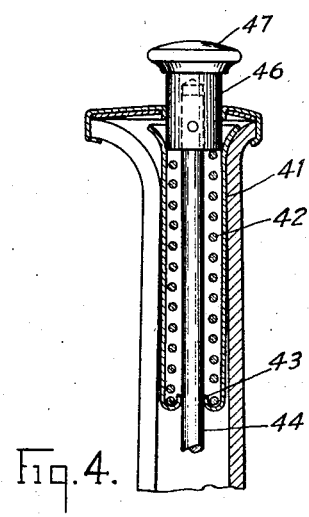
Fig. 3.
Fig. 4.
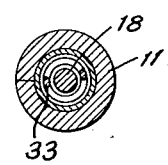
Fig. 5.
Inventors
William H. Schomburg
David R. Feemster
William L. Peters
By Breselton, Whitcomb & Davies
Attorney

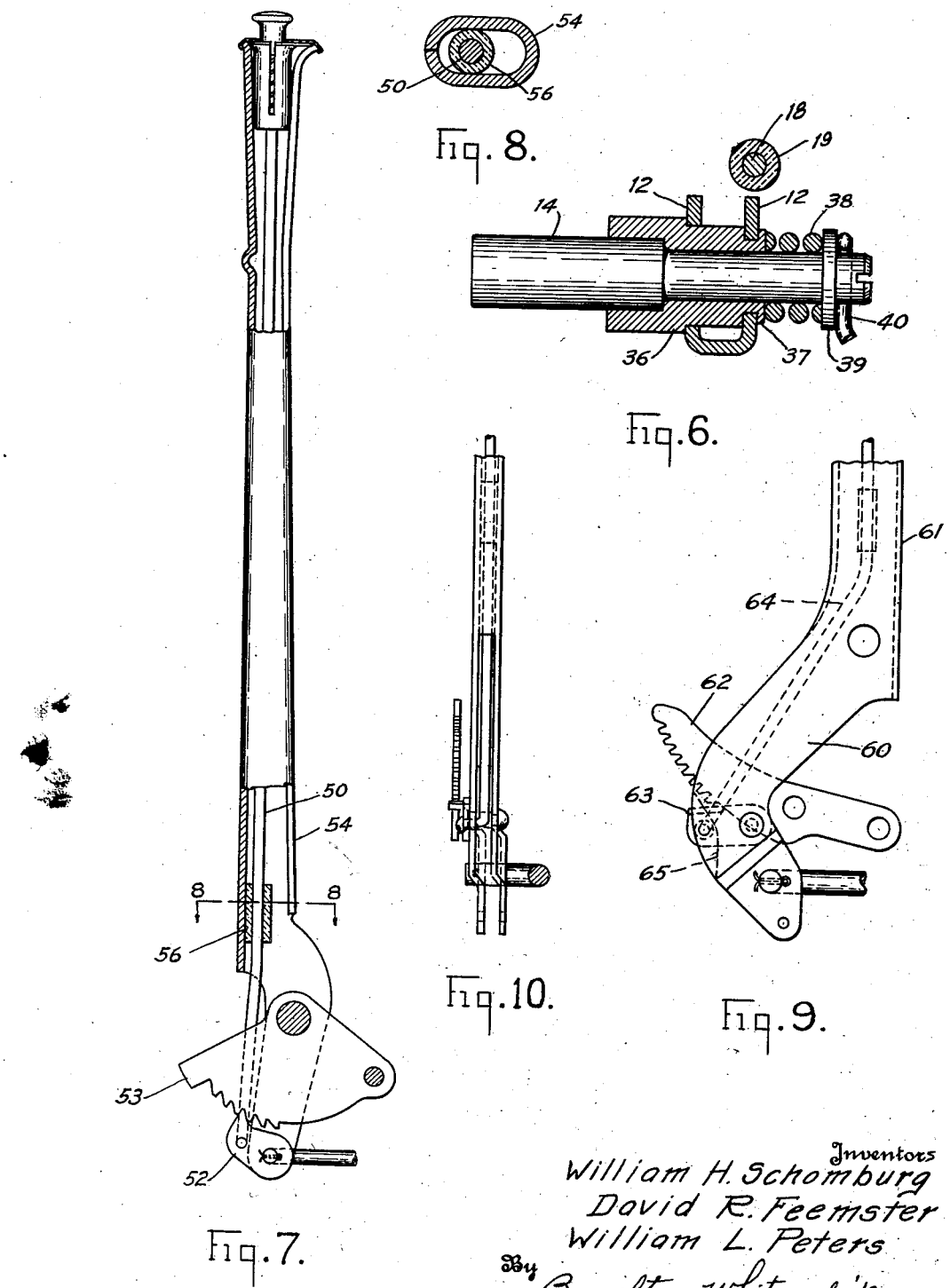

Patented Jan. 1, 1935

1,986,227

UNITED STATES PATENT OFFICE 1,986,227

LEVER

William H. Schomburg, David R. Feemster, and William L. Peters, Toledo, Ohio, assignors to The Bingham Stamping & Tool Company, Toledo, Ohio, a corporation of Ohio Application May 24, 1930, Serial No. 455,270

8 Claims. (Cl. 74—535)

This invention relates to levers and particularly to those levers of the type used for the controls of a motor vehicle or other similar mechanism.

The invention has for an object the provision of a lever of this character wherein the same may be stamped and formed from a sheet of material whereby the cost of production and assembly are substantially decreased.

The invention also embraces the provision of a lever combined with simple and effective means for preventing anti-chatter of parts of the lever and noises due to vibrations of the mechanism with which the lever may be used.

The invention further contemplates the provision of a novel and effective means for securing a bushing to the lever to provide a substantial supporting bearing for the lever.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which Figure 1 is a side elevational view of a lever of our invention, parts being shown in section;

Figure 2 is another view of the lever shown in Figure 1;

Figure 3 is an enlarged fragmentary view of the handle portion of the lever showing the particular arrangement of parts;

Figure 4 is a modified arrangement of parts of the handle portion of the lever;

Figure 5 is a sectional view taken substantially on the line 5—5 of Figure 3;

Figure 6 is an enlarged sectional view taken substantially on the line 6—6 of Figure 2;

Figure 7 is a view similar to Figure 1 showing a modified shape of lever body and arrangement of parts;

Figure 8 is an enlarged transverse sectional view through the lever taken substantially on the line 8—8 of Figure 7;

Figure 9 is a fragmentary view showing one end of a modified form of lever similar to the type shown in Figure 7;

Figure 10 is a side view of the parts shown in Figure 9.

We have illustrated several forms of lever of our invention as of a type used for the control of brakes of a vehicle, but it is to be understood that we do not wish to limit the invention to the particular disclosure illustrated and that we contemplate its use wherever the same may be found applicable.

Referring to the drawings in detail, and particularly Figures 1, 2, 3, 5 and 6 thereof, the main portion of the lever 9 is blanked or stamped from sheet metal or other suitable material and formed into a substantially hollow body 10 as illustrated. The body portion 10 is substantially oval in cross section while the handle portion 11 is circular in cross section as clearly shown in Figure 5, the edges of the formed lever being abutted or pressed together to form a tight seam which will remain tightly closed without necessity of welding. The lower portion of the lever body 10 is formed with oppositely disposed leg portions 12 which are provided with openings to receive a pivot pin or shaft 14, the depending legs straddling a ratchet sector 15 which may be fixedly supported upon pins or screws 13 carried by a support (not shown). The usual pawl lock 16 adapted for engagement with the serrations in the sector 15 is suitably pivoted to the legs 12 by means of a connecting link 17, adapted to be actuated by the lever to transmit the lever movement to mechanism (not shown), the pawl being controlled and operated by means of a pawl rod 18 which in the form of lever shown parallels the main body 10 of the lever and extends through the hollow handle portion 11 thereof.

A manipulating button 20 is secured by a pin 21 or other suitable fastening means to the upper extremity of the pawl rod 18 and protrudes above the handle portion 11. The upper portion of the handle 11 is flared as at 23, the opening being covered by means of a closure or plate 25 having a depending flange 26 adapted to engage the edges of the flared handle portion as particularly shown in Figures 1 and 3, the closure being reinforced by means of a plate 28. It is desirable in the manufacture of levers of this character to grind, or polish the handle portion 11 while it is unnecessary to nicely finish the body portion 10 of the lever. To this end the lower part of the handle 11 is provided with an embossed or raised portion 27 which acts as a distinct and pleasing separation of the finished handle from the substantially unfinished body portion.

The hollow portion of the handle 11 is adapted to receive a cup-like member 30, displacement of the member being prevented by flaring the upper end as at 31. In the form shown in Figures 1 and 3 the cup 30 encloses an expansive spring 33 which serves to keep the pawl rod 18 in its uppermost position, a member or washer 34 being interposed between the spring and the bottom portion of the cup 30, said washer being fabricated of rubber, felt or other material preventing direct engagement of the metal parts so as to prevent chatter or noise which may arise due to vibration of the mechanism with which the lever may be used.

Immediately beneath the manipulating button 20 is a washer 35 of rubber, felt or other vibration damping material interposed between the button and the cup 30 for the purpose of deadening noises arising from vibration.

In the form of lever shown in Figures 1 and 2, the body portion 10 is formed with an angular portion 22 which connects the two parallel portions of the lever. The pawl rod 18 is provided with a member or tube 19 of non-metallic material as, for example, rubber, fiber, felt and the like, preventing engagement of the parts.

The means for pivotally supporting the lever will now be described. The depending legs 12 of the lever are provided with axially aligned openings of substantially different diameters for the purpose of receiving a bushing 36, the latter being formed with portions adapted to snugly fit the openings in the legs 12. After the bushing has been inserted in the openings in the legs of the lever, the end of the bushing is swedged over as at 37 to hold the parts in fixed relation. The shaft or pivot pin 14 is retained within the bushing 36 by means of a spring 38 and washer 39, the latter being held in place by means of a pin 40 passing through the extremity of the shaft 14. It will be apparent that through the use of a spring 38, the shaft 14 will be maintained at all times in one position, the force of the spring serving to prevent noises which might arise due to vibration. The enlarged end of the shaft is suitably supported upon the vehicle by means (not shown).

In the form of lever shown in Figure 4, the cup member 41 enclosing and supporting a spring 42 is formed at its lower extremity with an inwardly and upwardly turned flange 43 forming an opening to receive the pawl rod 44 similar to the pawl rod 18. The opening in the lower end of the cup 41 formed by the flange 43 snugly receives the pawl rod so that there is no lost motion between the rod and the cup to cause noises through vibration of the parts. The shank 46 of the operating button 47 is also formed so as to snugly fit in the upper end of the cup 41 so that no lost motion is present between these parts.

In the form of lever shown in Figure 7 in which the body portion of the lever is in alignment with the handle portion, the pawl rod 50 extends through the hollow portion of the lever and is pivoted to a suitable pawl 52 engageable with a serrated sector 53 in a manner hereinbefore described. As particularly illustrated in Figure 8, the body portion 54 of the lever is substantially oval and the pawl rod 50 is provided with a short section of tubing of resilient material 56 which snugly fits over the pawl rod and prevents the latter from coming into contact with the walls of the body portion of the lever 54 so as to prevent any noises arising from vibration.

In the form of the invention shown in Figures 9 and 10, the depending legs 60 of the lever 61 extend rearwardly to accommodate a particular form of serrated sector 62 which cooperates with a pawl 63 pivoted to the extremity of the pawl rod 64. In this form of device the pawl rod is positioned throughout its length between the walls of the lever, the latter having one of its legs cut away as shown at 65 to accommodate the pivotal connection to the pawl 63. In this form of device, the pawl rod is provided with a section of rubber tubing to deaden noises.

It is apparent that, within the scope of the invention modifications and different arrangements may be made other than is herein disclosed, and the present disclosure is illustrative merely, the invention comprehending all variations thereof.

What we claim is:

1. A lever formed of sheet material having a hollow handle portion and a hollow offset body portion; a pawl rod passing through said handle portion and extending substantially coincident with and exteriorly of the body portion of the lever including said offset portion; means cooperating with said rod to latch or unlatch the lever; and spring means positioned in said handle portion for maintaining said pawl rod in one position.

2. A lever formed of sheet material having a hollow handle portion and a body portion; a pawl rod passing through said handle portion; a removable socket positioned within said handle portion; a manipulating button carried by the upper extremity of said rod; means including a member of resilient material interposed between said button and said socket adapted to normally hold said rod in one position; a flanged plate enclosing the upper end of said handle portion; and a reinforcing plate interposed between said flanged plate and said handle portion.

3. A lever formed of sheet material having a hollow handle portion and a body portion; a pawl rod passing through said handle portion; a removable socket positioned within said handle portion; a manipulating button carried by the upper extremity of said rod; means including a member of resilient material interposed between said button and said socket adapted to normally hold said rod in one position; a plate enclosing the upper end of said handle portion, said plate having an opening to accommodate said manipulating button and having a depending flange adapted for snug engagement with said button.

4. A lever formed of sheet material having a portion thereof substantially U-shaped in cross section, the walls of said U-shaped portion having axially aligned openings of different diameters; a bushing extending into said openings; and means forming a part of said bushing engaging with one wall of said lever to hold said bushing and lever in fixed relation.

5. A lever formed of sheet material and having a substantially U-shaped portion at one end thereof, the walls of said U-shaped portion having axially aligned openings of different diameters; a bushing extending into said openings, said bushing having shoulders engaging with the respective walls of said U-shaped portion for holding said walls in spaced relation.

6. A lever formed of sheet material and having a substantially U-shaped portion, the walls of said U-shaped portion having axially aligned openings of different diameters; a bushing extending into said openings, said bushing having shoulders engaging with the respective walls of said U-shaped portion for holding said walls in spaced relation; and a portion of said bushing being swedged to hold said bushing and lever in fixed relation.

7. A lever formed of sheet material and having a substantially U-shaped portion, the walls of said U-shaped portion having axially aligned openings of different diameters; a bushing extending into said openings, said bushing having shoulders engaging with the respective walls of said U-shaped portion for holding said walls in spaced relation; a shaft in said bushing having a shoulder thereon; and means including a spring for holding said shaft in one position.

8. A lever formed of sheet material and having a substantially U-shaped portion, the walls of said U-shaped portion having axially aligned openings of different diameters; a bushing extending into said openings, said bushing having shoulders engaging with the respective walls of said U-shaped portion for holding said walls in spaced relation, said bushing having an opening; a shaft in said opening having a shoulder adapted for engagement with a portion of said bushing; a washer carried by said shaft; and means including a spring interposed between said washer and said bushing for holding the parts in fixed relation.

WILLIAM H. SCHOMBURG.
DAVID R. FEEMSTER.
WILLIAM L. PETERS.

CERTIFICATE OF CORRECTION.

Patent No. 1,986,227.

January 1, 1935.

WILLIAM H. SCHOMBURG, ET AL.

It is hereby certified that error appears in the printed specification of the above numbered patent requiring correction as follows: Page 2, second column, strike out lines 18 to 27 inclusive, comprising claim 1; same page and column, line 32, present claim 2, after "portion;" insert the words said socket having a flange for defining its position in said handle portion;

Claims now appearing as 2, 3, 4, 5, 6, 7 and 8, should read 1, 2, 3, 4, 5, 6 and 7; and that the said Letters Patent should be read with these corrections therein that the same may conform to the record of the case in the Patent Office.

Signed and sealed this 9th day of April, A. D. 1935.

Leslie Frazer

Acting Commissioner of Patents.

(Seal)